(12) United States Patent
Marvin et al.

(10) Patent No.: US 9,797,490 B2
(45) Date of Patent: Oct. 24, 2017

(54) HIGH RELIABILITY ACTUATOR

(71) Applicants: Russel Hugh Marvin, Goshen, CT (US); David H. Leach, Torrington, CT (US)

(72) Inventors: Russel Hugh Marvin, Goshen, CT (US); David H. Leach, Torrington, CT (US)

(73) Assignee: LCDRIVES CORP., Goshen, CT (US)

( * ) Notice: Subject to any disclaimer, the term of this patent is extended or adjusted under 35 U.S.C. 154(b) by 42 days.

(21) Appl. No.: 14/671,327

(22) Filed: Mar. 27, 2015

(65) Prior Publication Data

US 2015/0276029 A1    Oct. 1, 2015

Related U.S. Application Data

(60) Provisional application No. 61/971,234, filed on Mar. 27, 2014.

(51) Int. Cl.
| | | |
|---|---|---|
| H01F 27/24 | (2006.01) | |
| F16H 25/20 | (2006.01) | |
| H02K 9/22 | (2006.01) | |
| B64C 13/28 | (2006.01) | |
| B64C 13/42 | (2006.01) | |
| H02K 7/06 | (2006.01) | |
| H02K 16/00 | (2006.01) | |

(52) U.S. Cl.
CPC .......... F16H 25/205 (2013.01); B64C 13/28 (2013.01); B64C 13/42 (2013.01); H02K 7/06 (2013.01); H02K 9/22 (2013.01); F16H 2025/2075 (2013.01); H02K 16/00 (2013.01); Y02T 50/44 (2013.01); Y10T 74/18624 (2015.01)

(58) Field of Classification Search
CPC ......... F16H 25/205; H01F 27/24; H02K 1/16; H02K 9/22; B64C 13/28; B64C 13/42; H02P 27/06; H02P 1/26; H02P 1/46
USPC .............................. 318/400.26, 400.01, 700
See application file for complete search history.

(56) References Cited

U.S. PATENT DOCUMENTS

| | | | | |
|---|---|---|---|---|
| 3,460,028 A | * | 8/1969 | Beaver ............... | G01N 27/9073 |
| | | | | 200/61.45 R |
| 3,857,535 A | * | 12/1974 | Osder ................. | G05D 1/0816 |
| | | | | 244/195 |
| 4,179,944 A | | 12/1979 | Conner | |

(Continued)

FOREIGN PATENT DOCUMENTS

GB            961621 A  *  6/1964  ......... B25B 23/1425

*Primary Examiner* — Kawing Chan
(74) *Attorney, Agent, or Firm* — Tarolli, Sundheim, Covell & Tummino LLP

(57) ABSTRACT

An actuator for moving a first component relative to a second component includes a first actuating mechanism secured to the first component and having a first motor, a first nut, and a first shaft secured to the first motor and the first nut such that the first nut is rotatable with the first motor. A second actuating mechanism is secured to the second component and has a second motor, a second nut, and a second shaft secured to the second motor and the second nut such that the second nut is rotatable with the second motor. A screw is threadably engaged with the first nut and the second nut such that rotation of at least one of the first motor and the second motor causes movement between the first and second nuts to move the second component relative to the first component.

25 Claims, 14 Drawing Sheets

(56) References Cited

U.S. PATENT DOCUMENTS

| | | | |
|---|---|---|---|
| 4,614,128 A | 9/1986 | Fickler | |
| 4,637,272 A * | 1/1987 | Teske | B64C 13/42 192/48.9 |
| 4,745,815 A | 5/1988 | Klopfenstein | |
| 5,214,972 A | 6/1993 | Larson et al. | |
| 5,216,364 A * | 6/1993 | Ko | B60G 17/01933 324/207.17 |
| 5,276,255 A | 1/1994 | Stark | |
| 5,518,466 A | 5/1996 | Tiedeman | |
| 5,831,353 A * | 11/1998 | Bolding | F04B 17/046 310/12.15 |
| 5,937,699 A * | 8/1999 | Garrec | B25J 18/025 74/89.35 |
| 6,554,175 B1 * | 4/2003 | Thompson | B23K 20/123 228/112.1 |
| 7,883,054 B2 | 2/2011 | Elliott et al. | |
| 7,963,529 B2 * | 6/2011 | Oteman | B60G 13/001 188/266 |
| 8,230,750 B2 * | 7/2012 | Flatt | B64C 13/42 244/99.2 |
| 8,336,818 B2 | 12/2012 | Flatt | |
| 9,024,491 B2 * | 5/2015 | Wakita | B64C 13/28 310/75 R |
| 2001/0018861 A1 * | 9/2001 | Glasson | F15B 15/283 92/5 R |
| 2003/0006761 A1 * | 1/2003 | Hiramatsu | G01D 5/2291 324/207.16 |
| 2004/0007923 A1 * | 1/2004 | Tesar | F16H 25/205 310/12.24 |
| 2005/0168084 A1 | 8/2005 | Tesar | |
| 2005/0269887 A1 * | 12/2005 | Blanding | B64C 13/00 310/112 |
| 2007/0068291 A1 | 3/2007 | Beatty et al. | |
| 2010/0012779 A1 | 1/2010 | Collins | |
| 2010/0203974 A1 | 8/2010 | Janker | |
| 2010/0243811 A1 * | 9/2010 | Stothers | B64D 15/14 244/134 R |
| 2011/0068287 A1 * | 3/2011 | Grimseth | F16K 3/0254 251/213 |
| 2011/0162344 A1 * | 7/2011 | Benson | F02C 7/232 60/39.282 |
| 2012/0042741 A1 * | 2/2012 | Jacob | F16H 57/0401 74/89.44 |
| 2014/0026634 A1 * | 1/2014 | Marinozzi | A61B 8/065 73/1.83 |
| 2014/0113828 A1 * | 4/2014 | Gilbert | H01L 39/126 505/100 |
| 2015/0114151 A1 * | 4/2015 | Hirai | F16H 25/205 74/89.25 |

* cited by examiner

HIGH RELIABILITY ACTUATOR

RELATED APPLICATIONS

This application claims the benefit of U.S. Provisional Application Ser. No. 61/971,234, filed Mar. 27, 2014, the entirety of which is incorporated herein by reference.

TECHNICAL FIELD

The invention relates to an actuator and, in particular, relates to an actuator having multiple motors for controlling movement between components in a reliable manner.

BACKGROUND

Airplane systems are driven to high reliability because of the consequence of failure while flying. The standard reliability required is less than one chance of failure in $10^9$ hours in any flight critical function. Current airplanes use multiple redundant electrical systems and multiple redundant hydraulic systems to power many types of systems. For the most critical applications, hydraulic actuators are commonly used today because of their ability to operate in parallel and their low probability of jamming. There is a desire to reduce and/or eliminate the hydraulic systems due to the maintenance and weight of these systems.

Electro-mechanical actuators designed for critical flight functions are made up of mechanical and electrical components. Almost all mechanical and electrical components do not have reliability in excess of $10^{-9}$ hours. This means all components of these actuator systems must have redundancy. Specifically, if there is a single gearbox or screw that can jam, this prevents the system from meeting this reliability approach. Different approaches including clutches, brakes, breakaway features, and series actuation have been suggested to meet this challenge, but to date have not been able to meet the size, cost, and weight requirements.

There are many patents and applications that are on high reliability electro-mechanical actuation. Concepts typically fall into one of 4 categories: 1) parallel actuators with each actuator having a frangible element in the case of a jam, 2) parallel actuators with each actuator having a clutch function that can be released upon a jam and reconnected after jam is cleared, 3) two concentric screws each with its own brake, or 4) two actuators in series to reduce the single point jam failure.

Designs in this first category that have frangible elements in them are typically the oldest. These designs all require enough overload capability in the parallel actuator to break a linkage or other mechanical element (e.g., U.S. Pat. No. 5,518,466.) They have the significant disadvantage that there is difficulty in assuring proper function because testing is destructive by definition. Further the mechanical design constraint of this overload force is a significant disadvantage in the system design and ultimately results in a larger package. In all of these designs, the linkage most not fail to break with a probability of greater than 1 in $10^5$ and this is a challenge to certify at best.

Designs in the second category employ a clutch type mechanism which addresses the weakness of destructive testing seen in the first category (e.g., U.S. Pat. No. 4,179,944 and U.S. Pat. No. 8,336,818.) This retains the challenge of certifying that the clutch mechanism must work with a probability greater than 1 in $10^5$. Further, this typically requires a detection of the failure and a separate action to disengage the clutch. This is not ideal because it disrupts the operation of the aircraft until this is done.

Designs in the third category employ two concentric screws with a brake between the two that is opened if the outer screw fails (e.g., U.S. Pat. No. 4,745,815). At the same time a brake between the outer screw and housing is activated. This has the challenge of achieving the reliability with two extra brakes in the system, which is even more severe than the clutch reliability issue for the second category.

Designs in the fourth category have two actuators in series that can each function if one of the actuators jams. Many of these patents, however, describe a system that still has a single point failure in a gear or other mechanism that cannot achieve the $10^{-9}$ reliability. It should be noted for comparison that in a hydraulic actuator used in parallel, a jam between the cylinder and the piston will cause a system failure. This means that this joint must have a reliability greater than $10^{-9}$. Unfortunately, very few mechanical joints are this simple, and it would be difficult to certify any linear mechanical joint other than a telescoping rod/piston joint for an incidence of jamming less than $10^{-9}$. In a hydraulic rotary actuator, there is an equivalent rotary seal that also must be able to achieve this $10^{-9}$ reliability. Since bearings do not meet this $10^{-9}$ reliability, rotary actuators may use concentric bearings to achieve this reliability.

One thing all fourth category designs have in common is the use of two motors, one for each of the two series actuators. Some of these actuators attempt to achieve the reliability without a parallel actuator by employing brakes on each of the motors should they fail. These have the inherent weakness that the connection point to the movable surface can still fail as a single point failure so this is not likely to be certifiable. This means that this category should be viewed as an approach to have a minimum of two actuators in series with a minimum of two actuators in parallel using at least four motors. There are different approaches shown i) where the two motors are concentric with each other (e.g. U.S. Pat. No. 4,614,128, US 2010/0203974), ii) the two screws are concentric with each other (e.g. U.S. Pat. No. 7,883,054, US 2005/0168084 US 2010/0012779), iii) two ball screws are on the same ball screw nut (e.g. U.S. Pat. No. 5,214,972). Each of these concepts conceptually addresses the single point jam condition, but many of these concepts do not show the detail of sensors and control necessary for the application or do not implement these concepts in a way that truly addresses the single point jam condition. Further, each of these configurations shown in these patents is a large unit that must have significant size and weight. Ultimately, if electro-mechanical actuation is going to be desirable over the incumbent solution it must be a simple, compact, and lightweight approach that does not exist in the literature.

SUMMARY OF THE INVENTION

In accordance with an aspect of the present invention, an actuator for moving a first component relative to a second component includes a first actuating mechanism secured to the first component and having a first motor, a first nut, and a first shaft secured to the first motor and the first nut such that the first nut is rotatable with the first motor. A second actuating mechanism is secured to the second component and has a second motor, a second nut, and a second shaft secured to the second motor and the second nut such that the second nut is rotatable with the second motor. A screw is threadably engaged with the first nut and the second nut such that rotation of at least one of the first motor and the second motor causes movement between the first and second nuts to move the second component relative to the first component.

In accordance with another aspect of the invention, an actuator for moving a first component relative to a second component includes a first actuating mechanism secured to the first component and having a first motor and a first nut rotatable with the first motor. A second actuating mechanism is secured to the second component and has a second motor and a second nut rotatable with the second motor. A tubular screw having first and second ends is threadably engaged with the first nut and the second nut such that rotation of at least one of the first motor and the second motor causes movement between the first and second nuts to move the second component relative to the first component. A pair of linear variable differential transformers extends into the first and second ends of the screw and are secured to the first and second actuating mechanisms. Each linear variable differential transformer includes a bushing extending into the screw and having a polygonal shape allowing for relative longitudinal movement between the bushing and the screw but preventing relative rotational movement between the bushing and the screw.

In accordance with another aspect of the invention, an actuator for moving a first component relative to a second component includes a first actuating mechanism secured to the first component and having a first motor and a first nut rotatable with the first motor. A second actuating mechanism secured to the second component has a second motor and a second nut rotatable with the second motor. A tubular screw having first and second ends is threadably engaged with the first nut and the second nut such that rotation of at least one of the first motor and the second motor causes movement between the first and second nuts to move the second component relative to the first component. A pair of linear variable differential transformers extends into the first and second ends of the screw. Each linear variable differential transformer includes a solid magnetic core surrounding by a plurality of windings and a first bushing secured to one of the first and second actuating mechanisms and extending around the core and windings. A second bushing is slidably connected to the first bushing and movable with the screw. The position of the second bushings relative to the first bushings is measured by applying voltage to the windings.

In accordance with another aspect of the present invention, an actuator for moving a first component relative to a second component includes a first actuating mechanism secured to the first component and having a first motor and a first nut rotatable with the first motor. A second actuating mechanism secured to the second component has a second motor and a second nut rotatable with the second motor. A roller screw is threadably engaged with the first nut and the second nut such that rotation of at least one of the first motor and the second motor causes movement between the first and second nuts to move the second component relative to the first component.

In accordance with another aspect of the invention, a linear voltage differential transformer includes a screw having an end and a magnetic bushing extending into and fixed to the end of the screw. A solid magnetic core extends within the bushing. A plurality of windings surrounds the core within the bushing. The position of the windings relative to the bushing is measured by applying voltage to the windings.

Other objects and advantages and a fuller understanding of the invention will be had from the following detailed description of the preferred embodiments and the accompanying drawings.

DETAILED DESCRIPTION

The invention relates to an actuator and, in particular, relates to an actuator having multiple motors for controlling movement between components in a reliable manner. In one example, the components are critical flight components of an aircraft. FIGS. 1-6 illustrate an actuator 20 connecting two components (shown schematically in FIGS. 1 and 2 at 300, 310) in accordance with an embodiment of the present invention.

The first and second components 300, 310 can be components of an aircraft and, thus, maintaining the integrity of the mechanical connection between the components is highly desirable. In one example, the first component 300 is the main body or fuselage of the aircraft and the second component 310 is a critical flight-control mechanism, e.g., the rudder or ailerons. It will be appreciated, however, that the components 300, 310 can constitute other parts of an aircraft or any other device where highly reliable operation is desirable.

Figure 1:
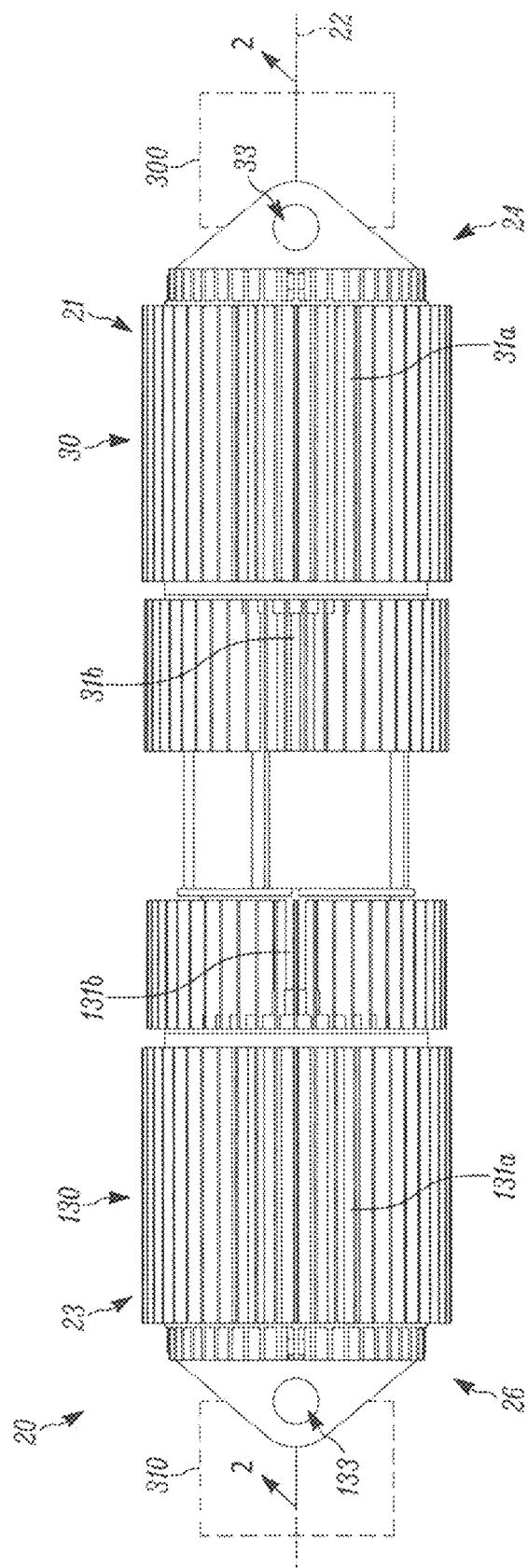
FIG. 1 is a schematic illustration of an actuator in accordance with an aspect of the present invention.
Figure 2:
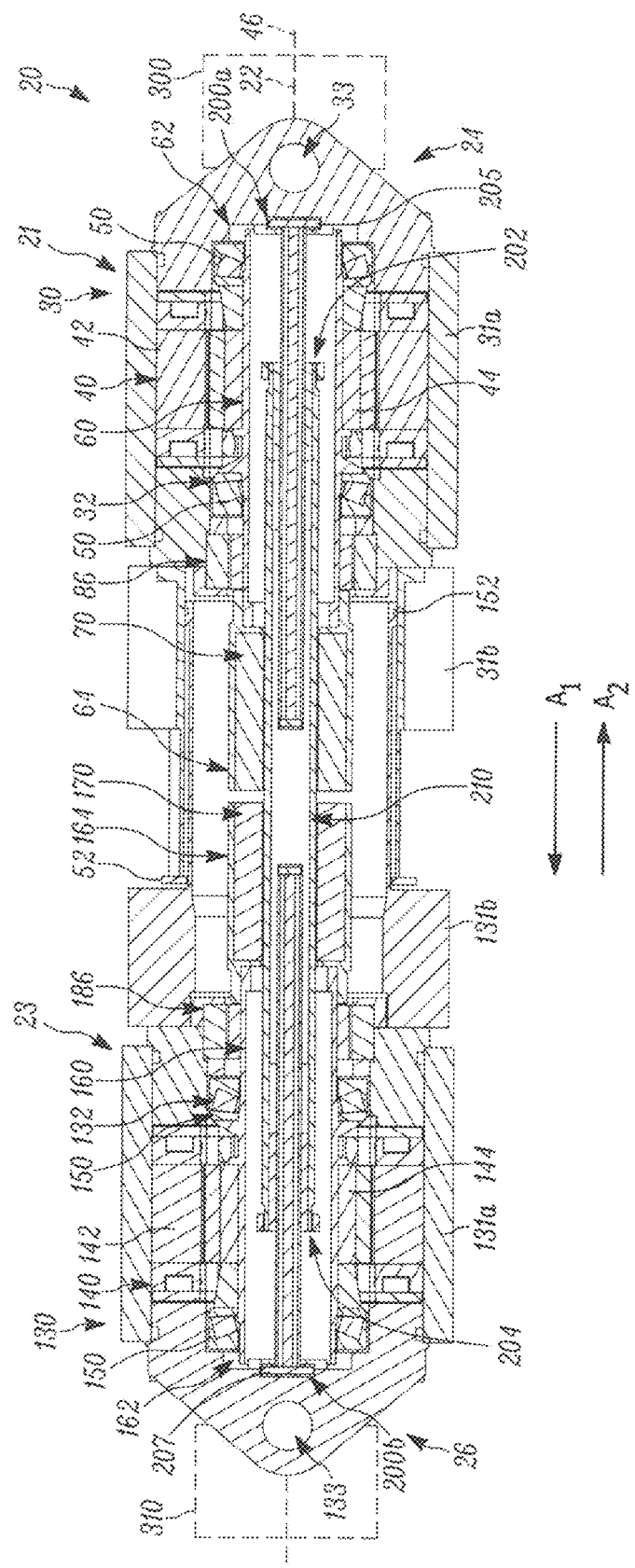
FIG. 2 is a section view of the actuator of FIG. 1 taken along line 2-2.

Referring to FIGS. 1 and 2, the actuator 20 is elongated and extends along a centerline 22 from a first end 24 to a second end 26. The actuator 20 includes a pair of actuating mechanisms 21, 23 movable relative to one another along the centerline 22. More specifically, the actuating mechanism 21 includes a first housing 30 and the actuating mechanism 23 includes a second housing 130 slidably connected to one another in a telescoping manner.

The first housing 30 has a tubular shape and includes a pair of interconnected portions 31a, 31b that cooperate to define an interior 32 in which a motor 40 is provided. An opening 33 extends through the exterior of the portion 31a. The opening 33 is aligned with the centerline 22 of the actuator 20 and is used to attach the portion 31a to the first aircraft component 300. The portion 31b of the first housing 30 includes a flange 52 having a portion extending radially inward into the interior 32.

Figure 3:
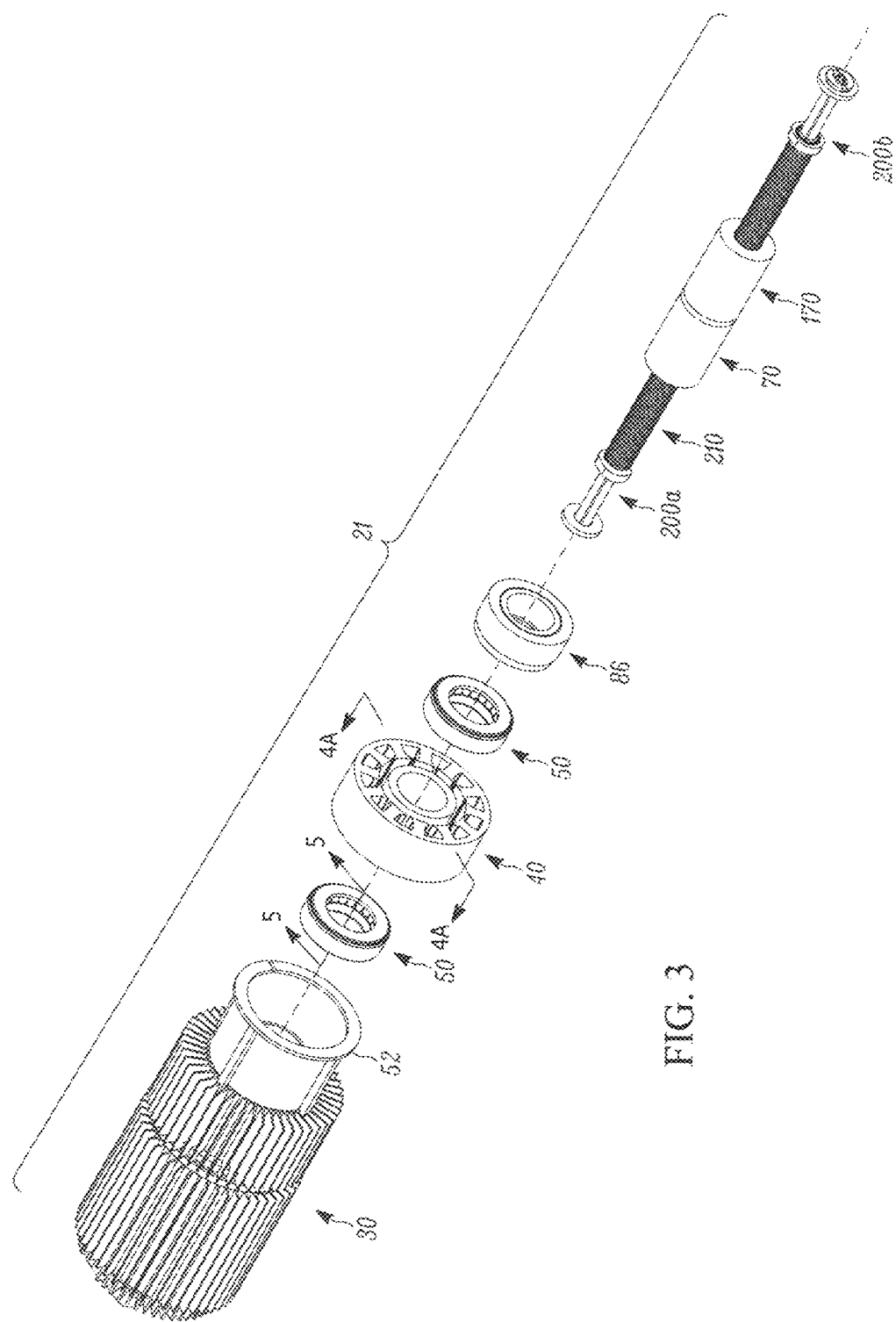
FIG. 3 is an exploded view of the actuator of FIG. 1.

Referring to FIGS. 3 and 4, the motor 40 is a conventional PM motor that includes a stator 42 fixed to the first housing 30 and a rotor 44 rotatable about an axis 46 within and relative to the stator in a known manner. One or more bearings 50 are also positioned within the interior 32 and connected to the first housing 30. As shown, two bearings 50 are provided on opposite sides of the motor 40 centered on the rotational axis 46 of the rotor 44.

Figure 5:
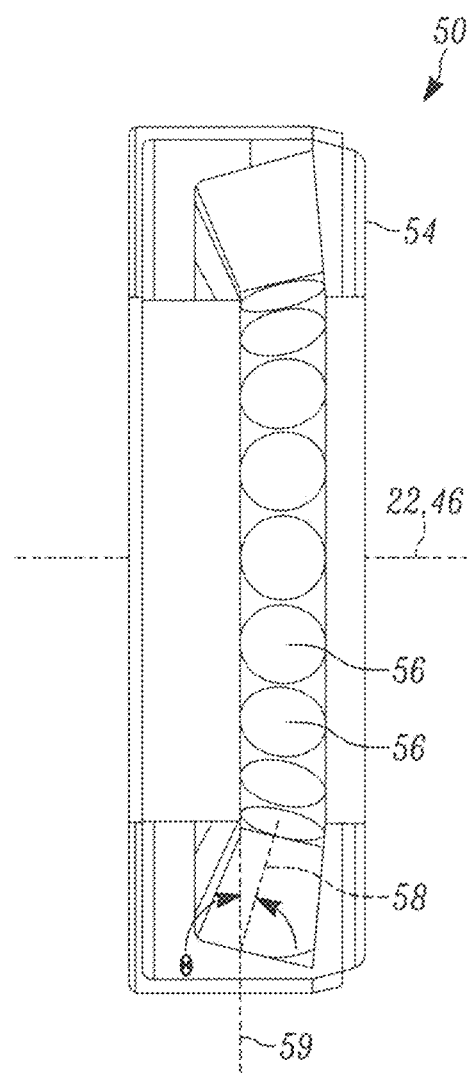
FIG. 5 is a section view of a bearing of FIG. 3 taken along line 5-5.

Referring to FIGS. 3 and 5, the bearings 50 constitute roller thrust bearings having an annular shape. The bearings 50 include a bearing cage 54 in which a series of rollers 56 are provided in a circumferential pattern about the axis 46. The hearing cage 54 lies generally within a plane 59 extending perpendicular to the centerline 22 of the actuator 20 and the rotational axis 46 of the motor 40. Each roller 56 has a frustoconical shape and rotates about an axis 58 relative to the cage 54.

Unlike conventional hearings, the rollers 56 of the bearings 50 are slightly tilted in one direction relative to the plane 59. In one example, the axes 58 of the rollers 56 extend at an angle θ of about 5° relative to the plane 59. The tilted roller 56 orientation reduces the rubbing on the end faces of the rollers and allows for accommodating radial loads on the bearings 50.

Referring to FIGS. 2 and 3, the actuator mechanism 21 further includes a tubular shaft 60 secured to and rotatable with the bearings 50 and the rotor 44. The shaft 60 extends from a first end 62 within the portion 31a of the first housing 30 to a second end 64 within the portion 31b of the first housing.

A roller nut 70 is fixed to, e.g., threadably engaged with, the second end 64 of the shaft 60 such that rotation of the motor 44 rotates the nut 70. The nut 70 has a fixed longitudinal position within the actuating mechanism 21. The nut 70 includes an inner surface defining a passage (not shown) extending longitudinally through the entire nut.

An annular resolver 86 (FIGS. 2 and 3) encircles the shaft 60 and is positioned longitudinally between the roller nut 70 and the motor 40. The resolver 86 senses and monitors the angular position of the shaft 60 about the axis 46. The resolver 86 is constructed of windings on steel cores (not shown) and contains no electronic components and, thus, the resolver has low failure rates similar to motor windings.

Figure 4B:
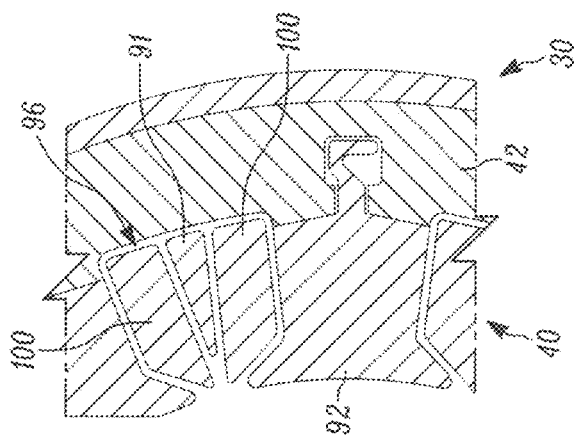
FIG. 4B is an enlarged view of a portion of the motor of FIG. 4A.
Figure 4A:
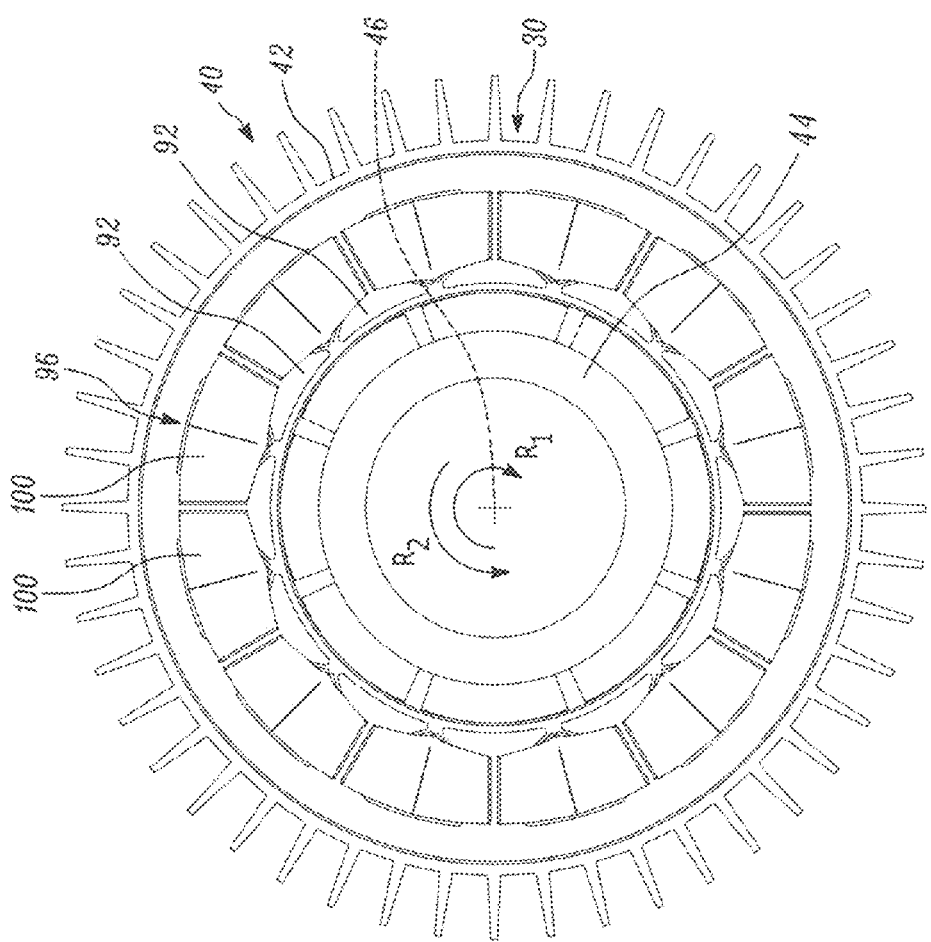
FIG. 4A is a section view of a motor of FIG. 3 taken along line 4A-4A.

FIGS. 4A and 4B provide more detail of the motor 40 of the actuating mechanism 21. The stator 42 is centered on the axis 46 and encircles the rotor 44. The rotor 44 can be constructed with a surface mount, permanent magnet topology having, for example, an eight pole configuration using 40UH neodymium magnets. A series of teeth 92 integrally formed with or connected to the stator 42 extend along the length of the stator parallel to the axis 46. The teeth 92 also extend radially inward towards the axis 46. In one example, the stator 42 has an eight pole, twelve slot configuration.

Passages 96 extend along the length of the stator 42 between consecutive pairs of teeth 92. One or more electrically conductive windings 100 loop around each tooth 92 in the axial direction and extend adjacent to the inner periphery of the stator 42. The windings 100 can be concentrated wound to optimize weight and performance. Applying electrical current to the windings 100 causes the rotor 44 to rotate about the axis 46 relative to the stator 42 in a first direction $R_1$ or a second, opposite direction $R_2$. The motor 40 is capable of handling continuous torque.

The motor 40 is cooled by a solid cooling bars 91 positioned within the passages 96 between the windings 100 around adjacent teeth 92 (FIG. 4B). The use of cooling bars 91 within the passages reduces the size of the motor 40 relative to conventional permanent magnet motors. The cooling bars 91 act as conduction elements that pull heat to the motor 40 endplates more efficiently than heat can be removed from the material of the stator 42. This helps reduce the stator 42 stack length while preserving reasonable duty cycles, all in a passive manner. Reduced stack length reduces the size and weight of the motor 40 and increases the efficiency at partial load.

The windings 100 are very fine wire (about 0.5 mm in diameter) in order to get the voltage close to the 270V bus voltage and simplify electronics and cabling. Insulated magnet wire has a transverse thermal conductivity of about 2 W/mK, even when ideally wound. This is because the insulation on the wire only has a thermal conductivity of about 0.25 W/mK and in the thermal calculation it dominates over the copper thermal conductivity. This results in a large fraction of the temperature rise occurring within the wire bundles.

By removing heat off two surfaces of the windings 100, it reduces the average temperature drop across the wire bundle by a factor of two. The heat transfer resistance through the solid cooling bar 91 is similar to the path out of the outside diameter of the stator 42 because the area if about ¹⁄₁₀, the path length is similar, and the heat conductivity of aluminum/copper is 10-20 times better than the lamination steel used in the stator 42. The solid cooling bar 91 is longitudinally split down the middle to eliminate any shorting issues and allow for hard attachment to the end bells of the motor 40.

Due to this construction, the motor 40 is capable of full regenerative braking, recycling all power back into the bus without requiring heat dissipative devices. The concept is scalable to smaller or larger motor 40 designs as well and high and lower speed duty cycles.

Referring to FIGS. 1 and 2, the second housing 130 of the actuating mechanism 23 has a tubular shape and includes a pair of interconnected portions 131a, 131b that cooperate to define an interior 132 in which a motor 140 is provided. An opening 133 extends through the exterior of the portion 31a. The opening 133 is aligned with the centerline 22 of the actuator 20 and is used to attach the portion 131a to the second component 310. The portion 131b of the second housing 130 includes a flange 152 extending radially outward into engagement with the interior of the portion 31b of the first housing 30. An o-ring seal (not shown) helps form a fluid-tight connection between the housings 30, 130 adjacent the flange 152.

The motor 140 is a conventional PM motor that includes a stator 142 fixed to the second housing 130 and a rotor 144 rotatable about an axis 146 within and relative to the stator in a known manner. One or more hearings 150 are also positioned within the interior 132 and connected to the second housing 130. As shown, two bearings 150 are provided on opposite sides of the motor 140 centered on the rotational axis 146 of the rotor 144. It will be appreciated that the motor 140 and bearings 150 have the same construction as the motor 40 and bearings 50, respectively. Therefore, a more detailed discussion of the motor 140 and bearings 150 is omitted for brevity.

The actuating mechanism 23 further includes a tubular shaft 160 secured to and rotatable with the bearings 150 and the rotor 144. The shaft 160 extends along the centerline 22 from a first end 162 within the portion 131a of the second housing 130 to a second end 164 within the portion 131b of the second housing.

A roller nut 170 is fixed to, e.g., threadably engaged with, the second end 164 of the shaft 160 such that rotation of the motor 140 rotates the nut 170. The nut 170 has a fixed longitudinal position within the actuating mechanism 23. The nut 170 further includes a threaded inner surface defining a passage (not shown) extending longitudinally through the entire nut.

An annular resolver 186 encircles the shaft 160 and is positioned longitudinally between the roller nut 170 and the motor 140. The resolver 186 senses and monitors the angular position of the shaft 160 about the axis 146. The resolver 186 has the same construction as the resolver 86.

A screw 210 positioned within the interiors 32, 132 of the housings 30, 130 transmits longitudinal/axial movement between the first and second aircraft components 300, 310 secured to the actuating mechanisms 21, 23. The screw 210 can be tubular or solid (not shown) and constitute any known screw type, e.g., roller screw, ball screw. In the present example, the screw 210 is a tubular roller screw.

The roller screw 210 extends along a centerline 203 from a first end 202 to a second end 204. The first end 202 includes a cap or base 205 secured to the interior of the first housing 30. The second end 204 includes a cap or base 207 secured to the interior of the second housing 130. The centerline 203 of the roller screw 210 is coaxial with the centerline 22 of the actuator 20 and the axes 46, 146 of the motors 40, 140.

The roller screw 210 includes a threaded outer surface 212 and an inner surface 214 defining a passage 216 extending the entire length of the roller screw. The roller screw 210 extends through the passages 66, 166 of both shafts 60, 160 and the passages 80, 180 of both nuts 70, 170. The outer surface 212 of the roller screw 210 is threadably engaged with the inner surfaces 74, 174 of the nuts 70, 170 (see FIG. 2). The roller screw 210 is made from a non-magnetic material, such as hardened stainless steel or a Ni—Cr alloy with a coating to provide surface hardness.

Figure 6:
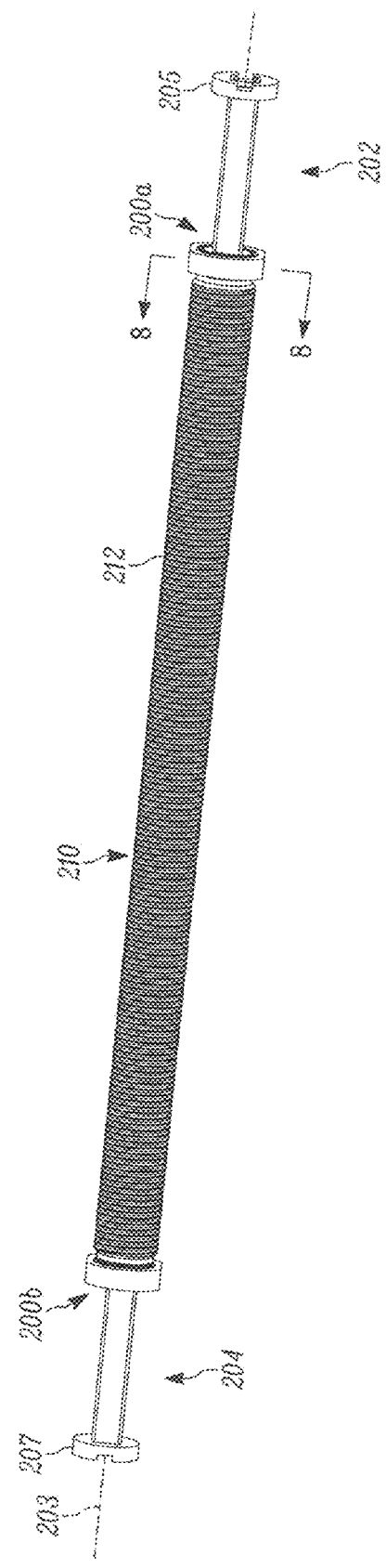
FIG. 6 is a schematic illustration of a roller screw of the actuator of FIG. 1.
Figure 7A:
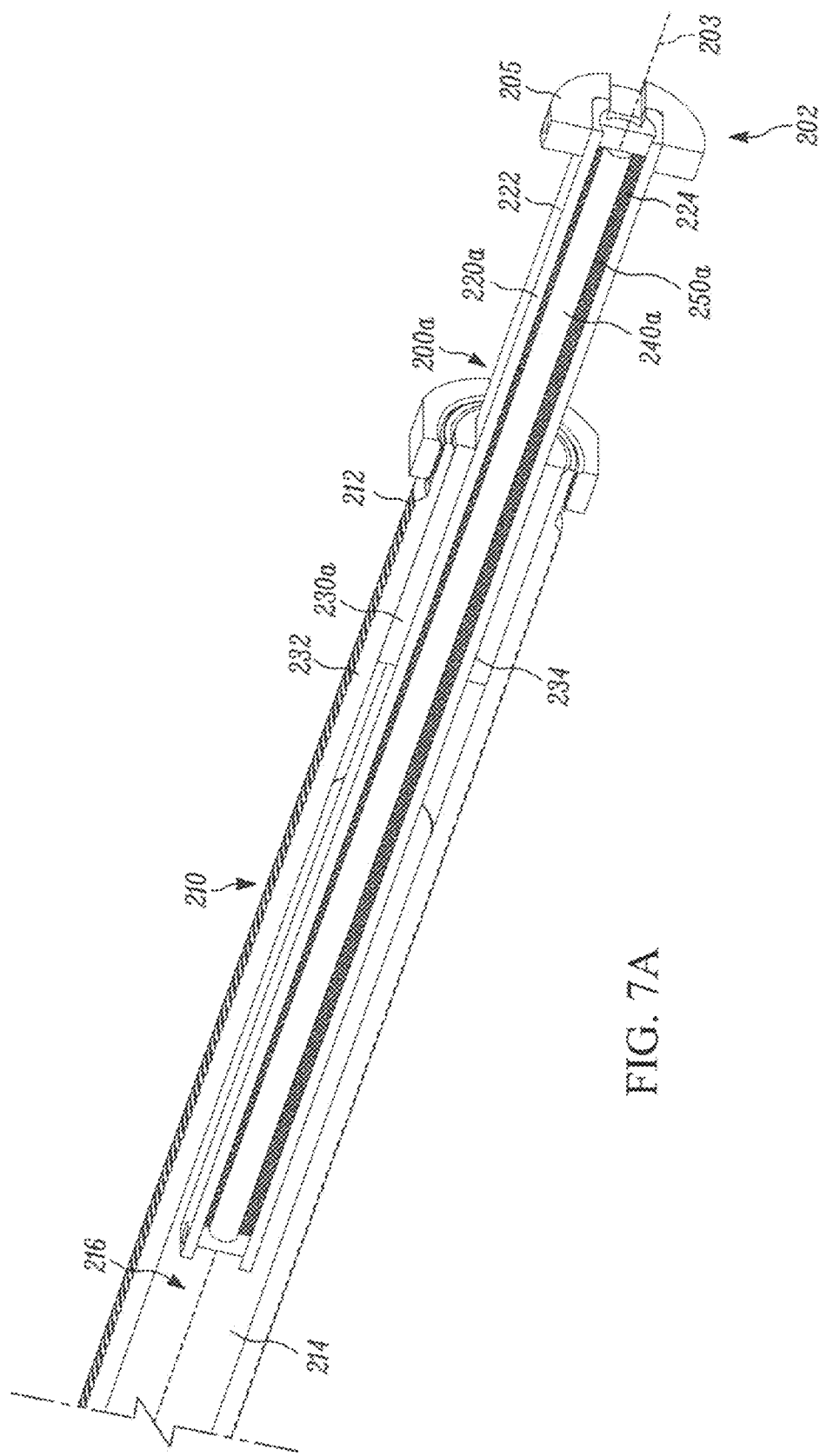
FIG. 7A is an enlarged view of a first end of the roller screw of FIG. 6.
Figure 7B:
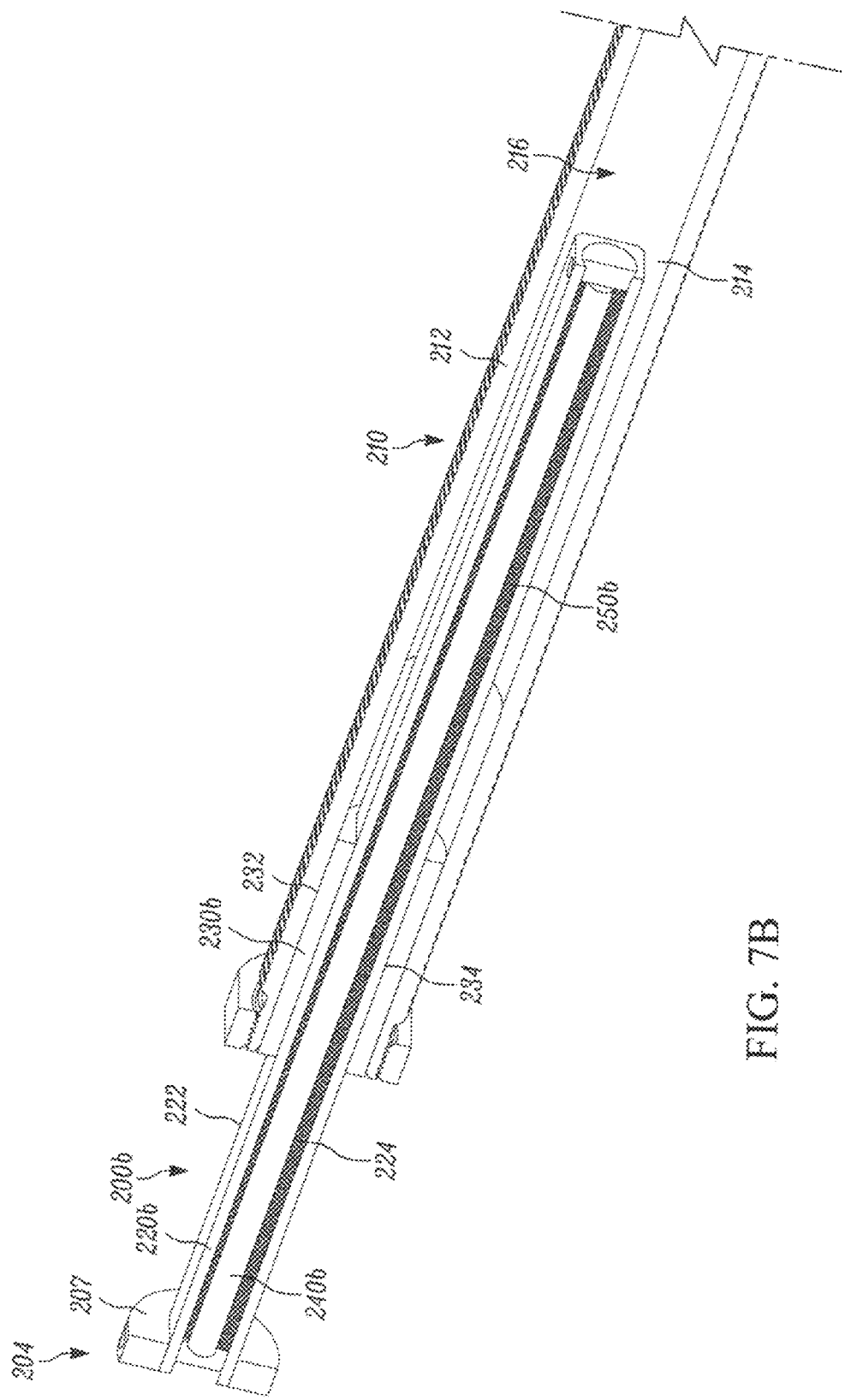
FIG. 7B is an enlarged view of a second end of the roller screw of FIG. 6.
Figure 8:
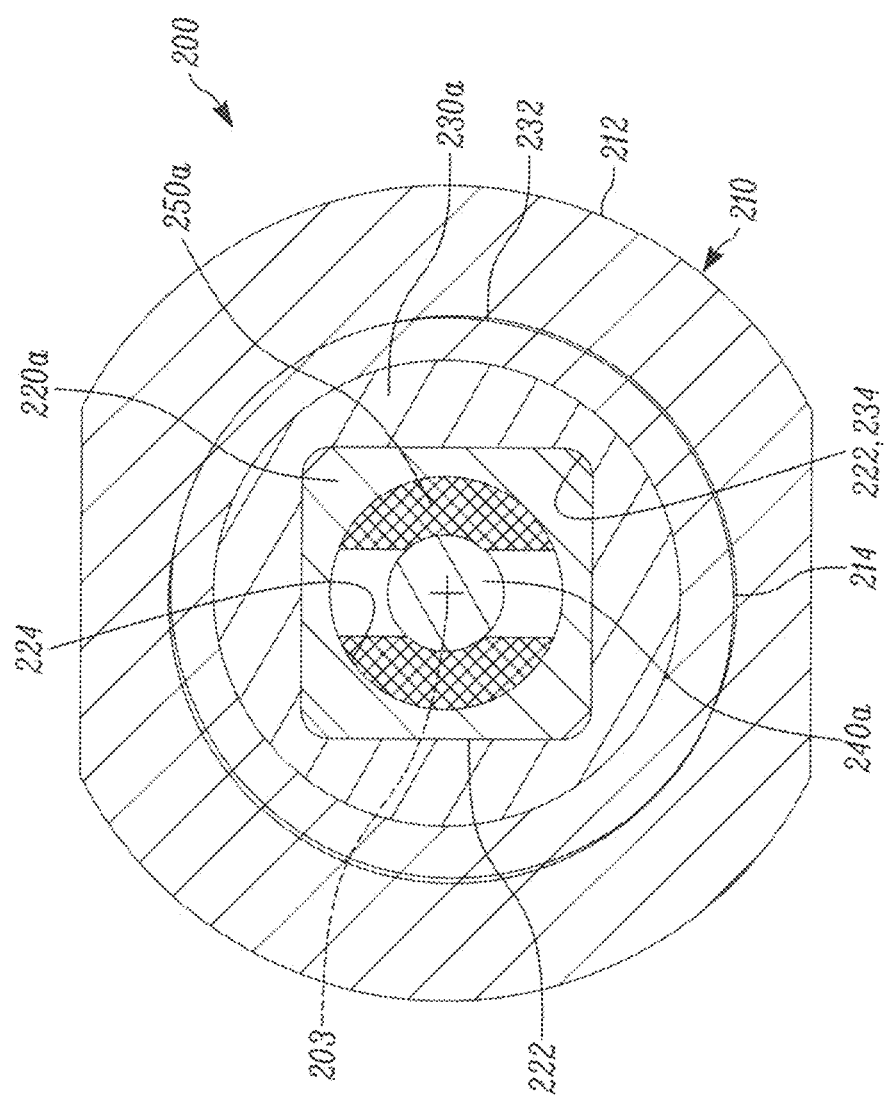
FIG. 8 is a section view of the roller screw of FIG. 6 taken along line 8-8.

Referring to FIGS. 6-8, a linear variable differential transformer (LVDT) 200a, 200b is provided at each end 202, 204 of the roller screw 210. Each LVDT 200a, 200b senses the linear distance between the end 202, 204 of the roller screw 210 and the associated end 24, 26 of the actuator 20. Each LVDT 200a, 200b is also inverted compared to conventional LVDTs.

Conventional long-stroke LVDTs have three windings wound along the length of a hollow, non-magnetic core with an outer magnetic sleeve along the entire length. The primary winding has uniform turn density along the length. Each secondary winding has a turn density that varies linearly with length, one increasing and the other decreasing. A magnetic plunger moves within the core and its position can be sensed by applying an AC excitation voltage to the primary winding and processing the voltage signals coming from each secondary winding.

Each LVDT 200a, 200b measures its position with respect to the roller screw 210 as the actuating mechanisms 21, 23 move relative to one another. The inverted LVDT 200a, 200b has the three windings wound around the length of a solid magnetic core 240a, 240b. The position of a movable magnetic sleeve (bushings 230a and 230b) around the outside of the windings is measured by applying AC excitation voltage to the primary winding and processing the voltage signals coming from each secondary winding.

Each LVDT 200a, 200b includes a first bushing 220a, 220b, a second bushing 230a, 230b, and a core 240a, 240b. One or more windings 250a, 250b extend around each core 240a, 240b and within the associated bushing 220a, 220b. The first bushings 220a, 220b are tubular and connected to the ends 202, 204 of the roller screw 210 in a telescoping manner (see FIGS. 7A-7B).

The second bushings 230a, 230b are tubular and connect each bushing 220a, 220b to the roller screw 210. Each bushing 230a, 230b is magnetic, e.g., steel, and includes an outer surface 232 forming a friction or interference fit with the inner surface 214 of the roller screw 210. Each bushing 230a, 230b has a polygonal, e.g., square, inner surface 234. An outer surface 222 of each bushing 220a, 220b has a corresponding polygonal shape to form a sliding fit with the inner surface 234 of the respective bushing 230a, 230b. This configuration prevents relative rotation between the bushings 220a, 230a and between the bushings 220b, 230b, but allows for longitudinal movement therebetween along the centerline 203 of the roller screw 210.

Each bushing 220a, 220b is non-magnetic and further includes an inner surface 224 defining a passage 226 extending the entire length of the respective bushing. Each end of the passage 226 receives one of the cores 240a, 240b, which are metal, e.g., steel.

As noted, the LVDTs 200a, 200b serve as both the linear position sensor and the anti-rotation feature for the roller screw 210. With respect to the anti-rotation capability, without a mechanism to prevent the roller screw 210 from rotating it could migrate towards one end 24, 26 of the actuator 20 and cause a jam. Conventional LVDTs have a movable steel core that is shorter in length than the windings and an outer steel sheath. For a stand-alone application, this is desirable in that the outer steel sheath provides magnetic shielding to prevent nearby magnetic objects from affecting the linearity and the moving part has the lowest mass.

On the other hand, each LVDT 200a, 200b of the present invention has a solid, full-length steel core 240a, 240b with windings 250a, 250b around it as well as bushings 230a, 230b that are shorter than the length of the windings. The LVDTs 200a, 200b are advantageous in that: 1) there is no extra length added for either the LVDT or the anti-rotation feature; 2) there is only one sliding surface [between each bushing 220a, 220b and bushing 230a, 230b] that could jam; and 3) the wires (not shown) to the windings 250a, 250b do not need to move as the roller screw 210 moves during operation.

It will be appreciated that the bushings 200a, 200b can be omitted from the LVDTs 200a, 200b if the anti-rotation feature is not needed or desired. Consequently, the position of the windings 250a, 250b relative to the respective bushing 230a, 230b is measured by applying voltage to the windings.

Referring to FIGS. 1 and 2, when it is desirable to move the second component 310 longitudinally in a first direction $A_1$ along the axis 22, the first motor 40 rotates in the direction $R_1$, causing the nut 70 to rotate in the direction $R_1$. Since the first nut 70 has a fixed longitudinal position relative to the housing 30, and the LVDT 200a prevents rotation of the roller screw 210, rotation of the first nut 70 in the direction $R_1$ causes the roller screw to move longitudinally along the centerline 22 in the direction $A_1$. To this end, the roller screw 210 and bushing 230a slide along the stationary bushing 220a in the direction $A_1$ due to the fixed connection between the cap 205 and the first housing 30. Consequently, the distance between the nuts 70, 170 increases.

If motor 140 is not spinning, the longitudinal movement $A_1$ is transferred from the roller screw 210 to the nut 170 and ultimately to the rest of the actuating mechanism 23, thereby moving the actuating mechanism 23 in the direction $A_1$. The LVDT 200b maintains the same relative relationship with the roller screw 210 when the motor 140 is not actuated, i.e., there is no relative movement between the LVDT 200b and roller screw.

The motor 140 can be actuated in lieu of or in addition to actuating the motor 40 to move the actuating mechanism 23 in the direction $A_1$. The only difference is that the motor 140 is rotated in the direction $R_2$ opposite the direction $R_1$ to longitudinally move the second component 310 relative to the first component 300 in the direction $A_1$. Otherwise, the interaction between the rotating nut 170 and roller screw 210 is identical to the interaction of the nut 70 with the roller screw when the motor 40 is rotated in the direction $R_1$. When the motor 140 rotates in the direction $R_2$, the roller screw 210 and bushing 230b slide in the direction $A_1$ along the bushing 220b fixed to the housing 130 and, thus, the distance between the nuts 70, 170 increases.

When it is desirable to move the second component 310 in a second direction $A_2$ opposite the first direction $A_1$, the above process is reversed. In particular, the first motor 40 is rotated about the axis 46 in the direction $R_2$. This causes the roller screw 210 and actuating mechanism 23 secured thereto to move longitudinally in the direction $A_2$ relative to the rotating nut 70, with the roller screw 210 and bushing 230a slide along the bushing 220a fixed to the housing 30. Consequently, the distance between the nuts 70, 170 decreases.

As with movement of the roller screw 210 in the direction $A_1$, the motor 140 can be actuated in lieu of or in addition to the motor 40 to move the actuating mechanism 23 in the direction $A_2$. The only difference is that the motor 140 is rotated in the direction $R_1$ opposite the direction $R_2$ in order to longitudinally move the second component 310 relative to the first component 300 in the direction $A_2$. When the motor 140 rotates in the direction $R_1$, the roller screw 210 and bushing 230b slide in the direction $A_2$ along the bushing 220b fixed to the housing 130 and, thus, the distance between the nuts 70, 170 decreases.

Figure 9:
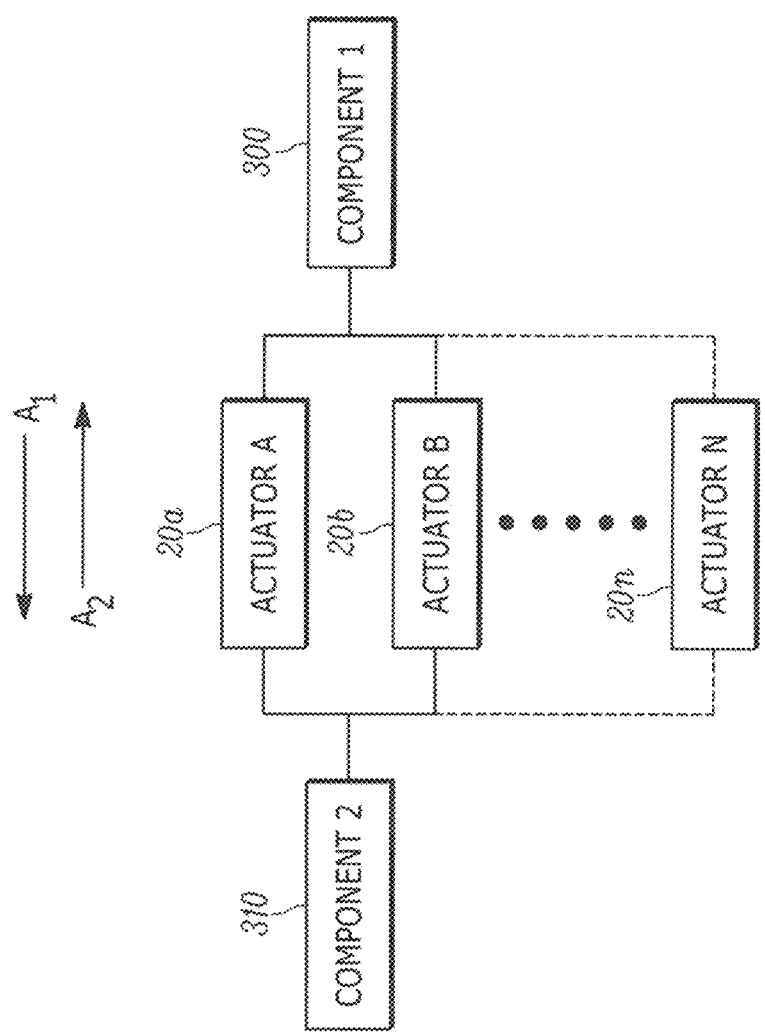
FIG. 9 is a block diagram illustrating a plurality of the FIG. 1 actuator arranged in parallel and being used to operate aircraft components.

FIG. 9 is a block diagram illustrating a control system utilizing a plurality of the actuators 20 to produce relative movement between the components 300, 310. Each separate instance of the actuator 20 is given the suffix "a", "b", etc. As shown, the control system includes a pair of actuators 20a, 20b. It will be appreciated, however, that more or fewer actuators 20 can be connected with the first and second components 300, 310 in accordance with the present invention.

The actuators 20a, 20b are connected in parallel with the first component 300 and the second component 310. More specifically, the first portions 31a of the first housings 30 (see FIG. 1) of each actuator 20a, 20b are connected to the first component 300 via the openings 33. The first portions 131a of the second housings 130 (see FIG. 1) of each actuator 20a, 20b are connected to the second component 310 via the openings 133.

When the actuators 20a, 20b are secured to the components 300, 310, the motors 40, 140 in one or more actuators can be actuated to adjust the distance between the nuts 70, 170 and thereby move the second component 310 relative to the first component 300 in the directions $A_1$ or $A_2$. In this configuration, although the motors 40, 140 of one actuator 20a can each supply full torque/speed to the roller screw 210, these motors typically operate at half speed and half torque if both are operational and the parallel actuator 20b is also operational.

The actuator 20 of the present invention is advantageous in that it behaves similar to a hydraulic actuator. The configuration allows the actuator 20 to still operate fully even if either nut 70 or 170 jams. It is believed that the only interface that can jam at a single point is along the o-ring seal (not shown) joining the two housings 30, 130.

The electronics and feedback systems for the actuators 20a, 20b are specially designed with internal redundancy such that two actuators in parallel are capable of achieving the $10^{-9}$ reliability without the need for redundant windings in the motors 40, 140. This is desirable as it helps minimize overall weight. Redundant windings drive up the size of the motor significantly because half of the winding area is unusable for the single drive.

The actuator 20 of the present invention uses a roller screw-based system that directly drives each nut 70, 170. Using motors 40, 140 to directly drive along the same the roller screw 210 eliminates gearboxes that can contribute to actuator failure. Although it is thought that direct drive systems are larger and heavier, this configuration unexpectedly packages quite nicely and minimizes size and weight with the added benefit of reduced complexity.

The roller screws 210 are configured to be back driven, i.e., a linear force on the roller screw by either component 300, 310 moving will cause the nuts 70, 170 to turn. The length of the roller screw 210 and the nominal position of the nuts 70, 170 on the roller screw allow the actuators 20a, 20b to be moved by external forces over its specified range of motion, even if the nut 70 or 170 on one of the actuating mechanisms 21, 23 becomes jammed.

Referring further to FIG. 2, during operation of the actuator 20, the motor 40 within the actuating mechanism 21 can malfunction or the bushing 220a can become jammed or stuck with the bushing 230a. Similarly, the motor 140 within the second housing 130 can malfunction or the bushing 220b can become jammed or stuck with the bushing 230b. Each actuator 20, however, is configured to maintain reliable operation if either actuating mechanism 21, 23 fails. For example, if the bushings 220a, 230a of the actuating mechanism 21 become jammed the motor 140 in the actuating mechanism 23 maintains the desired longitudinal movement of the roller screw 210 to move the second component 310. Similarly, if the bushings 220b, 230b within the actuating mechanism 23 become jammed the motor 40 in the actuating mechanism 21 maintains the desired longitudinal movement of the roller screw 210 to move the second component 310.

Alternatively or additionally, if any portion of one actuator 20a or 20b jams one or more of the remaining, parallel actuators can be actuated to maintain the desired longitudinal movement of the roller screw 210 to move the second component 310.

The attached Appendix shows the relative positions of the nuts 70, 170 and roller screw 210 for limit cases in normal and failed operation (i.e., jam of one of the actuating mechanisms 21, 23). When this occurs, the parallel actuator 20a or 20b keeps the system running or, in some instances, the remaining actuating mechanism 21, 23 on the same [jammed] actuator keeps the system running. The overall length of the actuator 20 scales as ~3× the travel distance, which is an improvement over the 9× travel distance for the configuration shown in the prior art.

Figure 10:
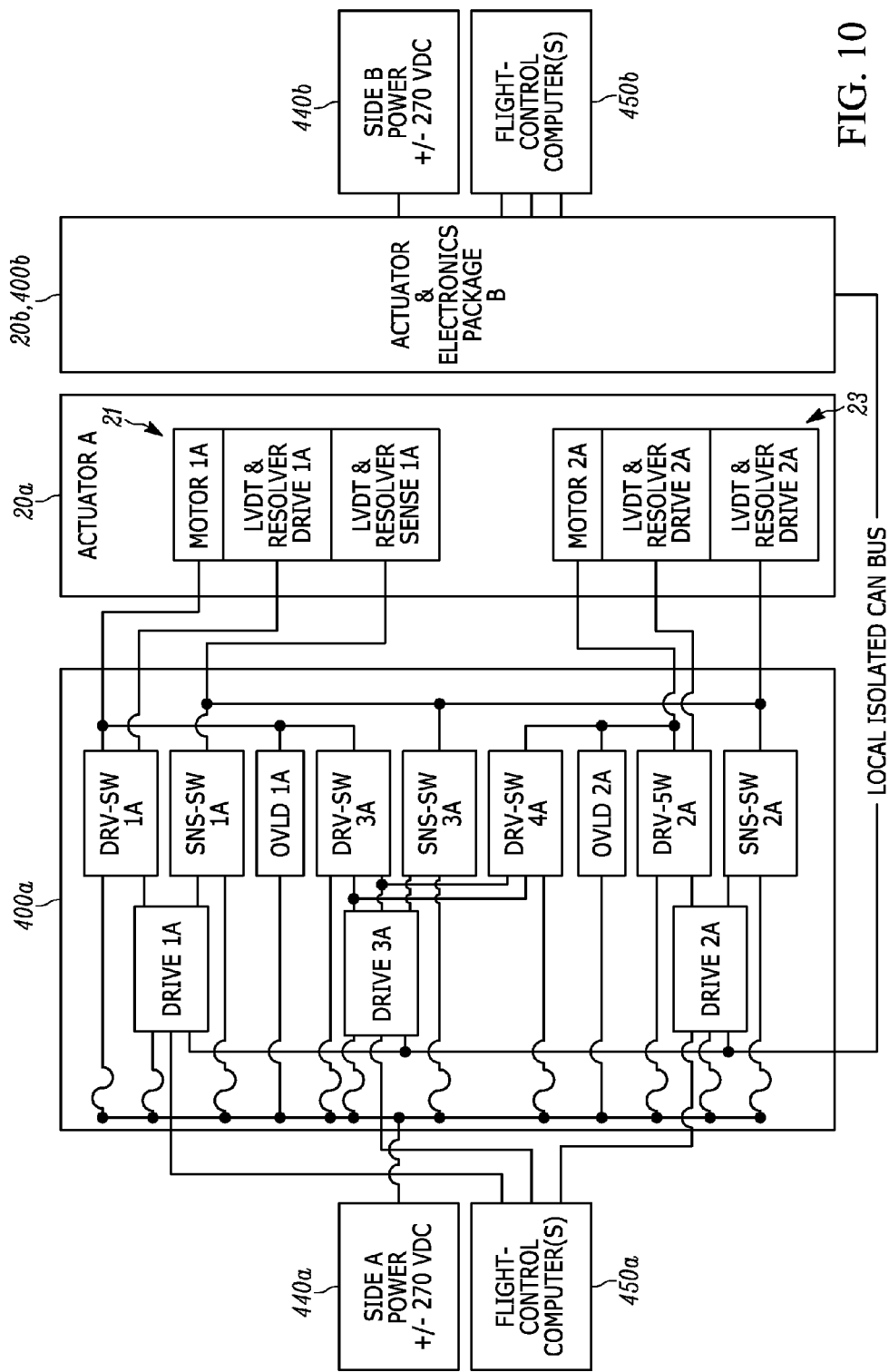
FIG. 10 is a block diagram for controlling operation of the actuators of FIG. 9.

Referring to the system block diagram of FIG. 10, an electronics package 400a, 400b for each actuator 20a, 20b forms a 1:2 redundant system. Each electronics package 400a, 400b includes a primary Drive 1A, 2A (each including an Inverter and Controller) for each actuating mechanism 21, 23 and one backup Drive 3A that can take the place of either primary Drive 1A, 2A in the event of a failure. During normal operation of the actuator 20a, for example, Drive 1A is connected to the actuating mechanism 21 and Drive 2A is connected to the actuating mechanism 23. In the event of a Drive 1A or Drive 2A failure, Drive 3A can take over. The switch network made up of switch sets DRV-SW 1A through DRV-SW 4A (each including switches for motor leads, an LVDT Drive, and Resolver Drive) is used to select which Inverter and sensor drivers are connected to which actuating mechanism 21, 23. The switch network made up of switch sets SNS-SW 1A to SNS-SW 3A is used to connect all three Controllers to the sensor output signals for all four sensors.

Each DRV-SW switch block includes switches to disconnect the associated LVDT and Resolver primary coils from the coil drive circuit in each Controller such that Drive 3A can take over driving the sensors if there is a failure. A disconnect switch for the coil drivers is provided within each Drive 1A-3A circuit so that if one of the sensor drive switches in the DRV-SW block fails shorted, a functioning Drive 1A or 2A can disconnect its own sensor drive and allow Drive 3A to drive the sensors. Each SNS-SW switch block has 16 switches that normally connect all three Drives 1A-3A to all four sensors, but is capable of disconnecting a Drive from the sensors in the event of a failure.

All switches in the DRV-SW and SNS-SW switch banks use the approach described for the motor-disconnect switches (transformer isolated gate drives and large spacings to other conductors in the system) to ensure that a short to something other than itself has a low failure rate commensurate with the high reliability mechanical components. Control of the operational state of the DRV-SW and SNSSW switch blocks is accomplished by each of the three controllers sending a binary command (open or close) to each of the switch blocks.

All three Controllers receive the same position commands from flight-control computer(s) 450a, 450b. In order for each Controller to independently perform fault detection, each Controller must also know the actual positions of both actuating mechanisms 21, 23. While only one Controller can drive the primary winding of an LVDT, all three Controllers can sense the primary and secondary waveforms (not shown) of both the LVDT 1A and the LVDT 2A. The electrical readout of the sense waveform coming from the secondary windings is typically done with a phase-sensitive detector, with the phase information coming from the primary waveform. This provides a low-noise sensing technique (similar to a lock-in amplifier) and different sensors may be driven at different frequencies to reduce cross talk.

An additional benefit of each Controller measuring the primary waveforms is that the amplitude of the primary waveform can be used to normalize the signal amplitude of the secondary waveform, which is proportional to both position and the amplitude of the primary waveform. This eliminates two sources of error: 1) different Controllers might drive primary windings with slightly different amplitudes, and 2) there can be tolerance differences between voltage references used by ADCs in different Controllers.

In operation, each of the three Controllers sends a binary command (open or close) to each of the four switch set 1A-4A drivers. Each switch set 1A-4A driver implements a voting circuit and operates in the state agreed upon by at least two of the three Controllers. This provides the necessary control redundancy because the switches will be set in the proper configuration as long as two of the three Controllers remain operational.

Figure 11A:
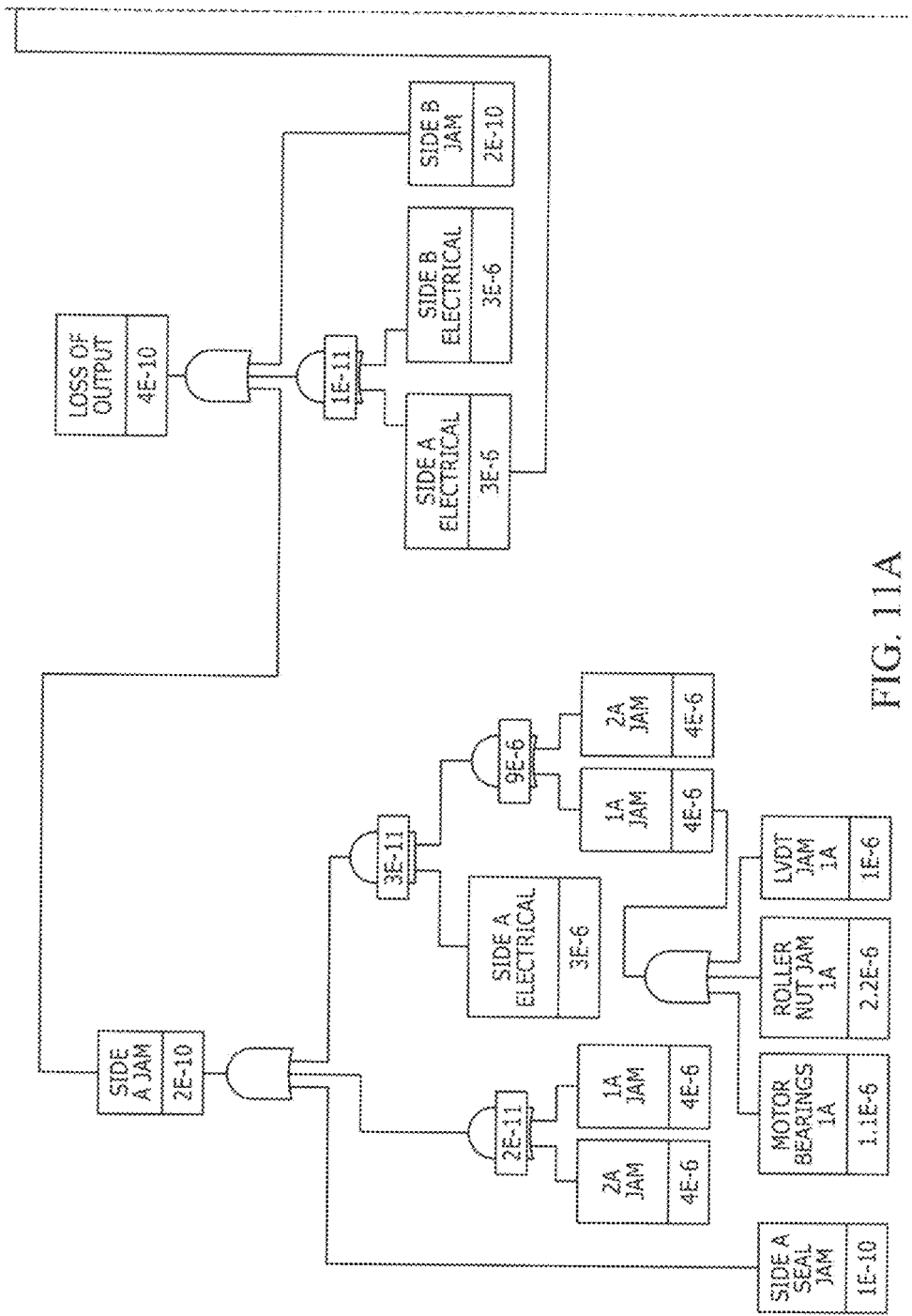
FIGS. 11A-11B illustrate a fault tree for estimating the failure rate of the actuators of FIG. 9.
Figure 11B:
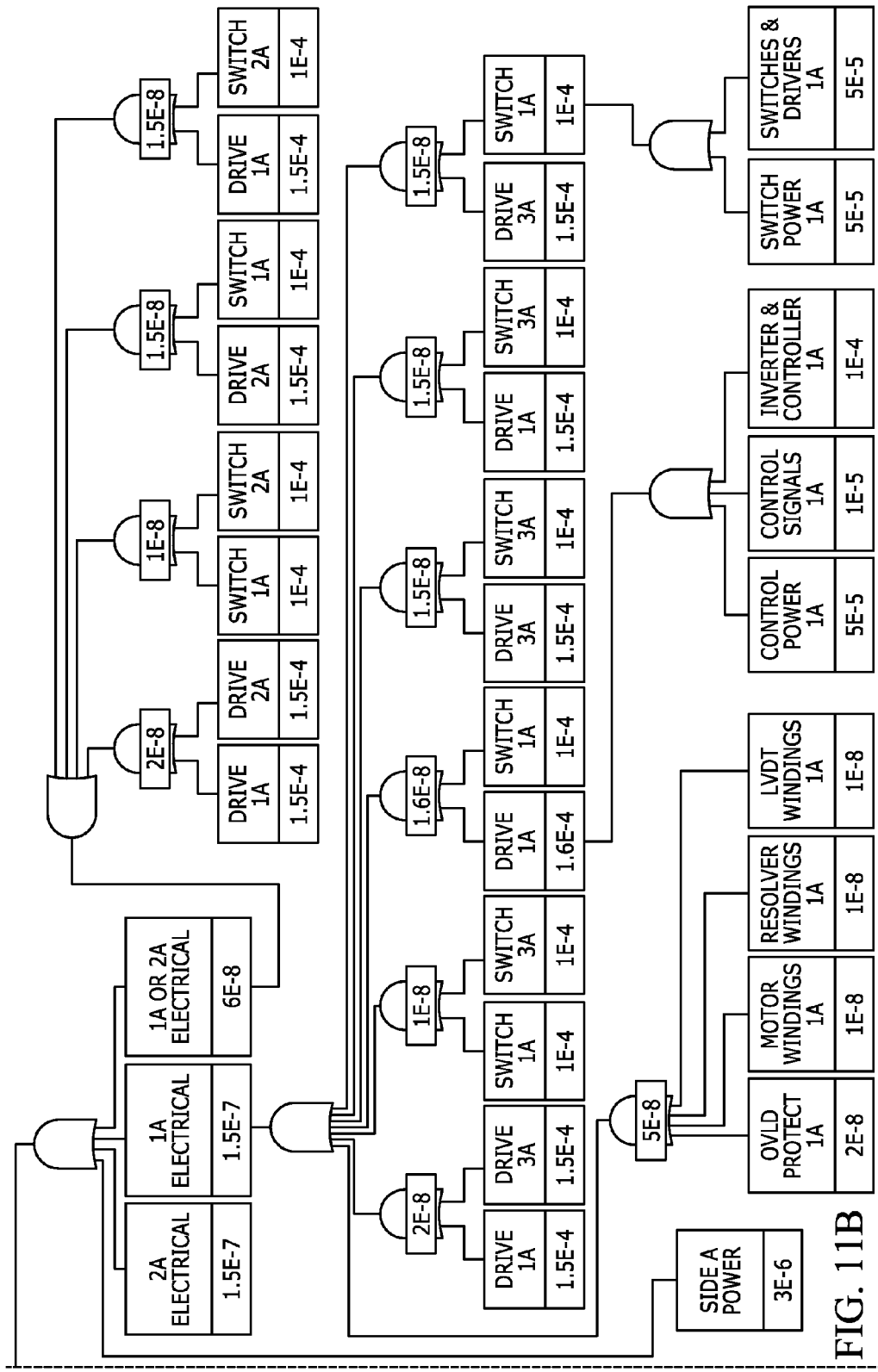

FIG. 11 is a fault tree depicting the fundamental failure types for the system used during operation of the actuators 20a, 20b. The numbers in scientific notation below each component represent an estimate of the failure rate for that particular component in failures/hour. The robustness of the system of the present invention stems from requiring a combination of at least four electronics failures (e.g., two in each actuator 20a, 20b) or a combination of at least two mechanical failures (e.g., two in same actuator) to cause ultimate system failure. There are sixteen combinations of two simultaneous electrical failures that result in the inability to drive either actuating mechanism 21 or 23. The six combinations involving Drive 1A, Switch 1A, Drive 3A, and Switch 3A result in a failure to drive the actuating mechanism 21. Not shown are the six combinations involving Drive 2A, Switch 2A, Drive 3A, and Switch 4A that result in a failure to drive the actuating mechanism 23.

The four combinations involving Drive 1A, Switch 1A, Drive 2A, and Switch 2A are types that bring down both primary Drives 1A and 2A, but since there is only one backup (Drive 3A) this results in a failure to drive one of the two actuating mechanisms 21 or 23. It is assumed for the electrical failure combinations that the appropriate type of failure happens in each block to produce an actual failure.

For the Switch 1A and Switch 3A combination, the failure occurs when both switches fail open. If both fail closed, no failure occurs because either Drive 1A or 3A would also have to fail, i.e., a triple failure with much lower likelihood of occurrence. Similarly, if one failed open and the other failed closed, then as long as the Drive behind the shorted switch is working no failure occurs. For the Drive 1A and Switch 1A combination, the failure occurs when both fail shorted. If either fails open, then Drive 3A can still take over. For the Drive 1A and Switch 3A combination, the failure occurs when Switch 3A fails open, preventing Drive 3A from taking over from the failed Drive 1A.

In practice, different types of failures, e.g., open or shorted, will have different failure probabilities but are lumped together with worst-case failure rate estimates to simplify the fault analysis. All three Controllers measure the position of both LVDTs 200a, 200b and both resolvers 50, 150 in each actuator 20a, 20b independently, and independently receive the same position commands from the flight computer(s) 450a, 450b. Consequently, all three Controllers can independently determine if each LVDT 200a, 200b is at the correct position and if either nut 70 or 170 is moving. If the actuator 20a, 20b starts in a fully functioning state and then the actuating mechanism 21 jams a number of things can occur. If the actuator 20a, 20b was moving to, but never reached, a new position the Drive 2A will keep moving while the Drive 1A does not. All three Drives 1A-3A will sense this.

When the Drive 2A senses that the Drive 1A isn't moving and is not at the correct position, it will send this status to the other Controllers and immediately go into a "FREE" mode. In this condition, the Controllers keep the Inverter 2A connected to its inverter but apply no torque so that the parallel actuator 20b can operate freely to keep the system functioning. If the back emf of motor 2A approaches +/−270 V rail voltages it will apply field weakening current to the motor to limit the back emf to less than 540 V without applying torque. A short time will be allowed to elapse for Drive 1A to perform internal diagnostics (apply short duration peak torque to see if the nut will move). If the nut 70 does not move Drive 1A sends a status that it is jammed and commands DRV-SW 1A to open and DRV-SW 3A to close.

Meanwhile, Drive 3A sends its status and, after the short diagnostic time has elapsed, both Drive 2A and 3A command DRV-SW 1A to open and DRV-SW 3A to close. With Drive 3A connected to the actuating mechanism 21 it will attempt to move the nut 70. If it also fails after a short duration it will send its status and all three Drives will send commands to open DRV-SW 3A and close DRV-SW 1A. Drive 1A will then go into a "CENTERING" mode where it applies some torque to attempt to move the nut 70 to the middle of the position range. The force on the nut 70 will be more than is applied by friction forces from the nut 170 on the roller screw 210 so it can prevent the nut 70 from moving out of the nominal range. The requirement that the actuator 20a electronics 400a be functioning during a Drive 1A or 2A jam is reflected in the fault tree.

Figure 12A:
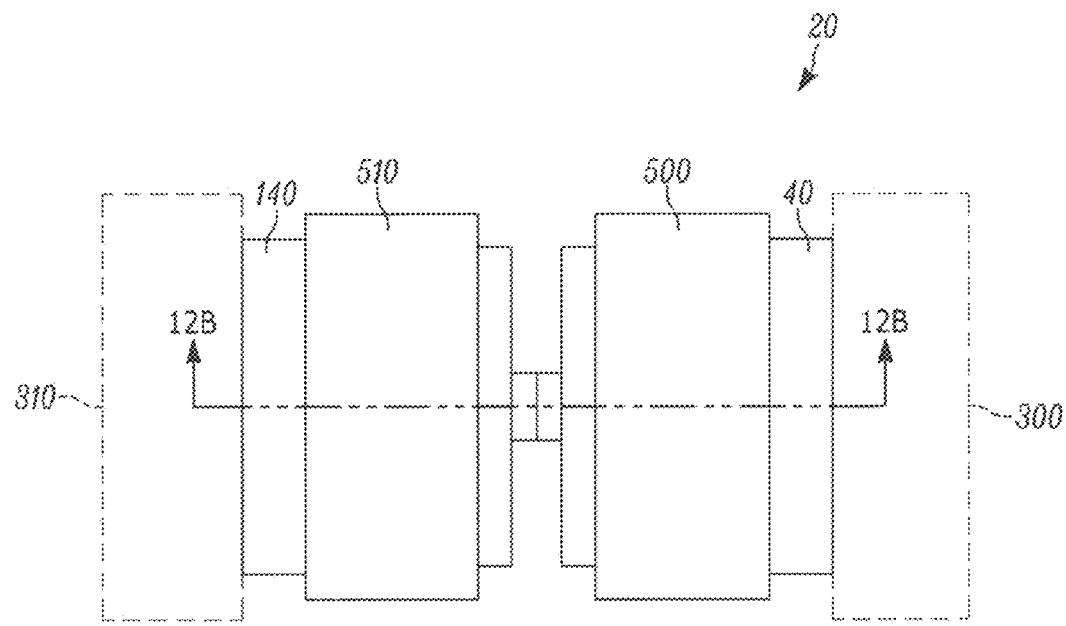
FIGS. 12A-12B are schematic illustrations of an actuator in accordance with another aspect of the present invention.
Figure 12B:
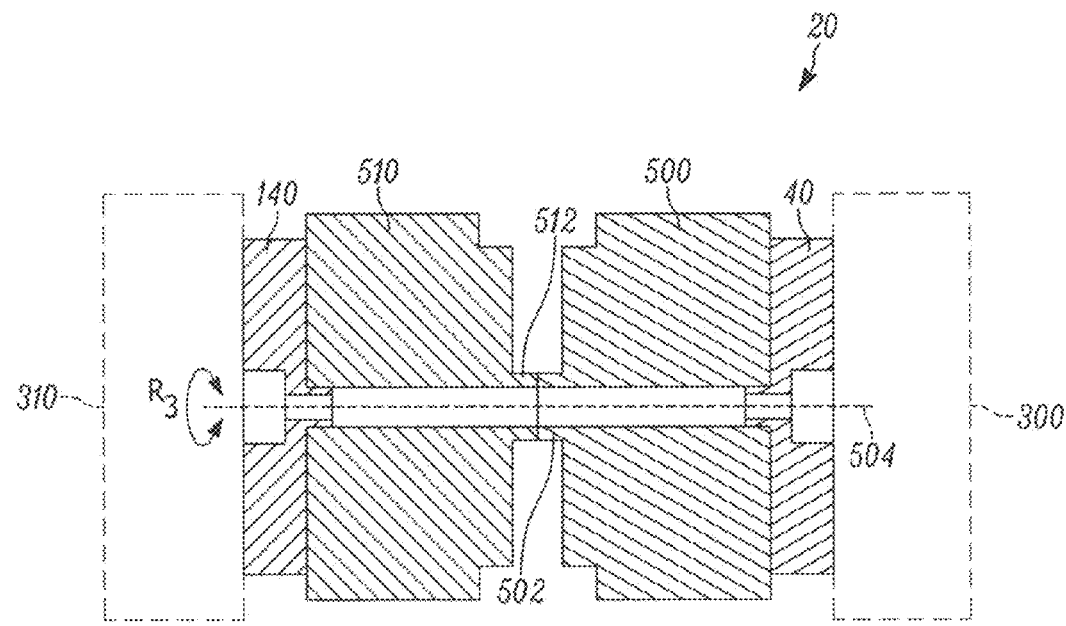

Although the present invention is illustrated and described as being used to longitudinally move the components 300, 310 relative to one another, it will be appreciated that the actuator 20 of the present invention can be modified so as to rotate the components 300, 310 relative to one another. In this configuration the same fault tolerance is achieved. In one example (FIG. 12), the actuator 20 includes a motor 40 and gearbox 500 connected to the fixed component 300 while the other motor 140 and gearbox 510 are connected to the movable component 310—in this case rotatable relative to the fixed component 300. The gearbox 500 includes an output shaft 502 and the gearbox 510 includes an output shaft 512. When actuated, the actuator 20a rotates the second component 310 about an axis 504 in the directions R₃ relative to the first component 300. This configuration has the same jam tolerance as the linear configuration and can include the same control operation and fault tree previously illustrated and described.

The preferred embodiments of the invention have been illustrated and described in detail. However, the present invention is not to be considered limited to the precise construction disclosed. Various adaptations, modifications and uses of the invention may occur to those skilled in the art to which the invention relates and the intention is to cover hereby all such adaptations, modifications, and uses which fall within the spirit or scope of the appended claims.

Having described the invention, the following is claimed:

1. An actuator for moving a first component relative to a second component comprising:
    a first actuating mechanism secured to the first component and having a first motor, a first nut, and a first shaft rigidly fixed to the first motor and the first nut such that the first nut is rotatable with the first motor and the first shaft, the first motor, and the first nut have fixed longitudinal positions on the first actuating mechanism;
    a second actuating mechanism secured to the second component and having a second motor, a second nut, and a second shaft rigidly fixed to the second motor and the second nut such that the second nut is rotatable with the second motor and the second shaft, the second motor, and the second nut have fixed longitudinal positions on the second actuating mechanism; and
    a screw threadably engaged with the first nut and the second nut such that rotation of at least one of the first motor and the second motor causes movement between the first and second nuts to move the second component relative to the first component.

2. The actuator of claim 1, wherein rotation of at least one of the first and second motors causes rotation of the second component relative to the first component.

3. The actuator of claim 1, wherein the screw is tubular and a linear variable differential transformer is provided within each of a first end and a second end of the screw, each linear variable differential transformer being secured to one of the first and second actuating mechanisms and including a first bushing extending into the screw, the first bushings having a polygonal shape allowing for relative longitudinal movement between the first bushing and the screw but preventing relative rotational movement between the first bushing and the screw.

4. The actuator recited in claim 3, wherein each linear variable differential transformer further includes a second bushing fixed to the screw and positioned radially between the first bushing and the screw, each first bushing being non-magnetic and each second bushing being magnetic.

5. The actuator recited in claim 4, wherein each linear variable differential transformer further includes a solid metal core extending within each first bushing and a plurality of windings surrounding the core within the first bushing.

6. The actuator recited in claim 5, wherein the position of the second bushings relative to the first bushings is measured by applying voltage to one or more windings and sensing voltage on the remaining windings.

7. The actuator recited in claim 1, further comprising a controller associated with each motor and a backup controller, the backup controller operating one of the first motor or the second motor if it is determined that one of the controllers associated with the motors has failed.

8. The actuator recited in claim 7, further comprising three motor drives and a switch network connected to the motor drives and the motors such that one of the motor drives operates at least one of the motors if either remaining motor drive fails.

9. The actuator recited in claim 8, wherein the switch network utilizes a voting scheme such that switches to operate the motors are determined by any two of the controllers agreeing on which switches to open and which to close.

10. The actuator recited in claim 1, wherein the screw is a roller screw.

11. The actuator recited in claim 1, wherein at least one of the first motor and the second motor is a permanent magnet motor.

12. The actuator recited in claim 1, wherein the first motor includes a stator having a plurality of radially extending teeth defining a plurality of slots therebetween, a winding extending around each tooth and a solid thermal conductor extending within each slot between adjacent windings for removing heat from the first motor.

13. The actuator recited in claim 12, wherein the screw is a roller screw.

14. The actuator recited in claim 12, wherein at least one of the first motor and the second motor is a permanent magnet motor.

15. An actuator for moving a first component relative to a second component along a centerline comprising:
    a first actuating mechanism secured to the first component and having a first motor and a first nut rotatable with the first motor;
    a second actuating mechanism secured to the second component and having a second motor and a second nut rotatable with the second motor;
    a tubular screw threadably engaged with the first nut and the second nut such that rotation of at least one of the first motor and the second motor causes longitudinal movement between the first and second nuts along the screw to longitudinally move the second component relative to the first component, the screw having a first end and a second end;
a first linear variable differential transformer secured to the first actuating mechanism and extending into the first end of the screw; and
a second linear variable differential transformer secured to the second actuating mechanism and extending into the second end of the screw, each linear variable differential transformer including a bushing extending into the screw and having a polygonal shape allowing for relative longitudinal movement between the bushing and the screw but preventing relative rotational movement between the bushing and the screw.

16. The actuator recited in claim 15, wherein each linear variable differential transformer further includes a second bushing fixed to the screw and positioned radially between the first bushing and the screw, each first bushing being non-magnetic and each second bushing being magnetic.

17. The actuator recited in claim 16, wherein each linear variable differential transformer further includes a solid metal core extending within each first bushing and a plurality of windings surrounding the core within the first bushing.

18. The actuator recited in claim 17, wherein the position of the second bushings relative to the first bushings is measured by applying voltage to one or more of the windings and sensing voltage on the remaining windings.

19. The actuator recited in claim 15, further comprising a controller associated with each motor and a backup controller, the backup controller operating one of the first motor or the second motor if it is determined that one of the controllers associated with the motors has failed.

20. The actuator recited in claim 19, further comprising three motor drives and a switch network connected to the motor drives and the motors such that one of the motor drives operates at least one of the motors if either remaining motor drive fails.

21. The actuator recited in claim 20, wherein the switch network utilizes a voting scheme such that switches to operate the motors are determined by any two of the controllers agreeing on which switches to open and which to close.

22. The actuator of claim 1, wherein the first shaft longitudinally spaces the entire first nut from the first motor and the second shaft longitudinally spaces the entire second nut from the second motor.

23. An actuator for moving a first component relative to a second component comprising:
a first actuating mechanism secured to the first component and having a first motor and a first nut rotatable with the first motor;
a second actuating mechanism secured to the second component and having a second motor and a second nut rotatable with the second motor;
a tubular screw having first and second ends and being threadably engaged with the first nut and the second nut such that rotation of at least one of the first motor and the second motor causes movement between the first and second nuts to move the second component relative to the first component; and
a pair of linear variable differential transformers extending into the first and second ends of the screw, each linear variable differential transformer including:
a solid magnetic core surrounding by a plurality of windings;
a first bushing secured to one of the first and second actuating mechanisms and extending around the core and windings; and
a second bushing slidably connected to the first bushing and movable with the screw;
wherein the position of the second bushings relative to the first bushings is measured by applying voltage to one of the windings and sensing voltage on the remaining windings.

24. A linear voltage differential transformer for a tubular screw having an end, comprising:
a magnetic first bushing extending into and fixed to the end;
a non-magnetic second bushing positioned within and slidably engaged with the first bushing;
a solid magnetic core extending within the second bushing; and
a plurality of windings surrounding the core within the second bushing and positioned inside the magnetic first bushing;
wherein the position of the second bushing relative to the first bushing is measured by applying voltage to the windings.

25. The linear voltage differential transformer of claim 24, wherein the longitudinal position of the second bushing relative to the first bushing is measured by applying voltage to the windings.

* * * * *